United States Patent [19]

Müller-Horsche

[11] Patent Number: 5,247,531
[45] Date of Patent: Sep. 21, 1993

[54] APPARATUS FOR PREIONIZING APULSED GAS LASER

[75] Inventor: Elmar Müller-Horsche, Kissing, Fed. Rep. of Germany

[73] Assignee: Lambda Physik Forschungsgesellschaft mbH, Fed. Rep. of Germany

[21] Appl. No.: 849,960

[22] Filed: Mar. 12, 1992

[30] Foreign Application Priority Data

Mar. 15, 1991 [DE] Fed. Rep. of Germany ....... 4108474

[51] Int. Cl.⁵ .............................. H01S 3/00
[52] U.S. Cl. .............................. 372/38; 372/86; 372/87
[58] Field of Search ................ 372/86, 87, 38

[56] References Cited

U.S. PATENT DOCUMENTS

| | | | |
|---|---|---|---|
| 4,555,787 | 11/1985 | Cohn et al. | 372/86 |
| 4,718,072 | 1/1988 | Marchetti et al. | 372/86 |
| 4,953,174 | 8/1990 | Eldridge et al. | 372/86 |
| 5,090,021 | 2/1992 | Nakatani et al. | 372/86 |

FOREIGN PATENT DOCUMENTS 0398330  5/1990  European Pat. Off. .
60-157280  8/1985  Japan .

OTHER PUBLICATIONS

"Japanese Journal of Applied Physics", vol. 29, No. 1, Jan. 1990, pp. 95-100 (K. Nakamura et al.).

*Primary Examiner*—Léon Scott, Jr.
*Attorney, Agent, or Firm*—Woodard, Emhardt, Naughton, Moriarty & McNett

[57] ABSTRACT

An apparatus for preionization of a pulsed gas laser comprises corona preionization electrodes (12, 12') which are each arranged adjacent a respective associated main electrode (10, 10'). To generate an effective preionization with low constructional and circuit expenditure the preionization electrodes (12, 12') are set under voltage with the same high-voltage source (16) which also supplies the main electrodes (10, 10') with voltage. By means of an inductance (30) a time delay is set between the excitation of the preionization electrodes and the triggering of the main discharge between the main electrodes (10, 10').

4 Claims, 2 Drawing Sheets

APPARATUS FOR PREIONIZING A PULSED GAS LASER

BACKGROUND OF THE INVENTION

1. Field of the Invention

The invention relates to an apparatus for preionizing a pulse gas laser comprising preionizing electrodes each arranged adjacent associated main electrodes in order to generate on excitation by means of high voltage ultraviolet radiation which prior to a main discharge between the main electrodes effects the preionization of the gas, the main discharge being triggered by means of high-voltage pulses generated by a high-voltage source.

2. Description of the Prior Art

Pulsed gas lasers, for example excimer lasers and $CO_2$ lasers, can be operated in accordance with the prior art by socalled transverse pulsed gas discharges (TE gas lasers). This gas discharge (also referred to as plasma discharge or main discharge) takes place perpendicularly to the optical axis of the laser. The energy necessary for the main discharge is stored in a capacitor and transferred to the plasma during the discharge. The plasma discharge usually takes place in the laser chamber between main electrodes arranged parallel to the optical axis.

The power and other qualities of the laser depend inter alia substantially on the homogeneity of the plasma discharge. To ensure the necessary homogeneity of the plasma discharge at different pressures of the working gas in accordance with the gas mixture, a socalled preionization is necessary before the plasma discharge (main discharge). The preionization of the gas in the space between the main electrodes of the laser is carried out in particular also to avoid arc discharges.

In such a preionizing the gas is ionized in the discharge space between the main electrodes to prepare for the main discharge, i.e. free electrons are generated in the gas. Typically, in such a preionizing relatively low electron concentrations (for example $10^7$ electrons/cm$^3$) are generated in the discharge space. In the main discharge, which takes place delayed with respect to the preionization, the low initial concentration of free charges generated during the preionization is multiplied in a short time via socalled avalanche processes and by ionizing processes in the laser gas electron concentrations of $10^{14}$ to $10^{15}$ electrons/cm$^3$ are reached.

In the prior art different methods of preionization are known. Usually, ultraviolet radiation is used which is obtained for example by spark gaps or by corona discharges.

Spark preionization apparatuses involve a considerable constructional expenditure, requiring in particular the introduction of a plurality of insulated high-voltage passages in gas-tight manner in the laser chamber on both sides along the main electrodes, and furthermore spark preionization systems also have the disadvantage that by erosion processes in the hot spark plasmas gas impurities arise which impair the laser performance and in particular the life of the laser.

Generally, spark preionization systems provide a higher electron density in the discharge gas than corona preionization apparatuses. However, with corona preionization apparatuses as well it is possible to achieve a glow discharge sufficient for a pulsed gas laser and of good homogeneity, in particular in the case of XeCl excimer lasers and $CO_2$ lasers.

In the corona preionization apparatus ultraviolet light is generated in a gas discharge between a metal and a dielectric. This ultraviolet radiation then generates in the gas of the discharge space the aforementioned weak ionization, i.e. the generation of free electrons referred to. Following this preionization a homogeneous gas discharge can then be triggered between the main electrodes of the laser.

In a corona preionization apparatus the dielectric prevents the formation of spark channels to the preionization electrodes (which are to be distinguished from the main electrodes in a manner known to the person skilled in the art). During the preionization only the electrical capacitance formed from the preionization electrodes and the dielectric is charged. In spite of relatively low currents an intensive emission of UV light is obtained (G. J. Ernst and A. G. Boer, Opt. Commun. 27, 105, 1978; U. Hasson and H. M. von Bergmann, Rev.Sci. Instrum. 50, 59, 1979).

In such a use of dielectrics in the corona preionization sparks are effectively suppressed and thus also the disadvantages caused by sparks, in particular erosion processes at the electrodes and gas impurities.

The prior art of corona preionization apparatuses contains essentially two types of electrical connection of the corona electrode. Either the corona electrode is supplied from a separate high-voltage circuit, i.e. the corona electrode has its own high-voltage source independent of the main electrodes, or the corona electrode is connected in simple manner directly to the electrical potential of the counter main electrode. This prior art will be explained in detail hereinafter with the aid of FIGS. 1 to 4.

FIGS. 1 to 3 show different embodiments of a corona preionization apparatus in which the corona electrode is connected to the potential of the counter main electrode (R. Marchetti and E. Penco, J. Appl. Phys. 56, 3163, 1984). In known manner, two main electrodes 10, 10' are arranged opposite each other in the laser chamber. Adjacent the one main electrode 10 preionization electrodes 12, 12' are arranged. Each of the preionization 12, 12' is surrounded by a tubular dielectric (e.g. ceramic) 14, 14'. A high-voltage source known per se is designated by the reference numeral 16. The high-voltage source 16 charges a storage capacitor 18. Via a thyratron the gas discharge is switched in known manner. For this purpose, in known manner a recharge inductance 22 (coil) is provided and discharge capacitors $C_1$, $C_2$ are connected in parallel with the main discharge taking place between the main electrodes 10, 10'.

In accordance with FIG. 1 the preionization electrodes 12, 12' arranged adjacent the one main electrode 10 are connected to the potential of the counter main electrode 10', i.e. the preionization electrodes 12, 12' have the potential of the counter main electrode 10' and due to their smaller spacing from the one main electrode 10 a very high field strength arises between the one main electrode 10 and the preionization electrodes 12, 12' and generates a corona discharge on the dielectric tubes 14, 14'. The corona discharge in turn emits UV radiation which preionizes the gas between the main electrodes 10, 10'.

FIG. 2 shows a modification of the example of embodiment according to FIG. 1, two preionization electrodes 12, 12' now being arranged near the lower main electrode 10' but being connected to the potential of the counter main electrode 10 so that the corona discharge effecting a preionization burns close to the main electrode 10' drawn at the bottom in the Figures.

In the Figures, corresponding components are provided with the same reference numerals. In FIGS. 2 and 3 the high-voltage source 16, the storage capacitor 18, the thyratron 20 and the resistor $R_1$ have not been illustrated for the sake of simplicity.

A corona preionization apparatus according to the FIGS. 1 and 2 has the advantage that defects in the dielectric (for example small holes and cracks) can lead to electrical breakdowns (between the preionization electrode and the adjacent main electrode) in which the energy of the main discharge can be used up and the dielectric 14, 14' can be destroyed. Admittedly, such a consumption of the energy of the main discharge or a destruction of the corona dielectric can be prevented by a capacitive current limiting by means of the capacitors $C_3$, $C_4$; however, such a capacitative voltage division also leads to a loss of efficiency in the transfer of electrical energy to the corona discharge.

The separate current supply of the preionization electrodes shown in FIG. 4 by means of a separate switch 26 and a separate high-voltage source 28 (apart from the high-voltage source 16) requires a relatively great constructional expenditure for the switching elements and the synchronization circuits for the time synchronization of preionization and main discharge when compared with the socalled automatic or autonomous circuits according to FIGS. 1, 2 and 3 explained above In the journal "JAPANESE JOURNAL OF APPLIED PHYSICS", Vol. 29, No. 1, January 1990, p. 95-100 (article by K. NAKAMURA et al.) for the preionization an independent separate circuit is provided (separate with respect to the voltage supply of the main electrodes). This separate preionization circuit consists of the elements $G_3$, $C_3$, $L_3$, $C_S$ and $L_S$.

JP 60-157 280 (A) describes a preionization in which the preionization electrodes are driven via an auxiliary capacitor. EP 0 398 330 A2 also describes such an arrangement in which a driving of the preionization electrode is effected via an auxiliary capacitor (number 12 in FIG. 4). In these last two systems of the prior art mentioned the corona electrode is subjected to high voltage for an unnecessarily long time and this leads to an increased risk of dielectric breakdown. The prior art according to the last three documents mentioned requires in each case a complicated structure of the main electrode (either mesh electrodes or electrodes with buried corona rods).

For laser systems with very high repetition rates and long lives these known systems have not proved very suitable.

SUMMARY OF THE INVENTION

The invention is based on the problem of setting forth a simple apparatus for the preionization of a pulsed gas laser which achieves a preionization of good quality whilst requiring low constructional and circuit expenditure.

According to the invention this problem is solved in that the excitation of the preionization electrodes is effected with the same high-voltage source which also charges the capacitors of the main electrodes and by means of an inductance a time delay is set between the excitation of the preionization electrodes and the triggering of the main discharge between the main electrodes.

The electrical driving of the preionization electrodes according to the invention (in a simple modification of the invention a single preionization electrode may also be provided) utilizes the knowledge that the voltage drop at the deliberately inserted or parasitically present inductance in the socalled recharging circuit can be utilized to apply a voltage to the preionization electrodes a short time before application of the high-voltage pulse to the main electrodes (with respect to said main electrodes) in such a manner that a good preionization is achieved by means of corona discharge. For during the charging of the discharge capacitors $C_1$, $C_2$ a relatively large current change occurs and by connecting the preionization electrode before the inductance a very rapidly arising potential difference occurs between the preionization electrodes and the main electrode and thus a correspondingly intensive corona discharge.

DESCRIPTION OF THE PREFERRED EMBODIMENT

Hereinafter two examples of embodiment of the invention will be described in detail with the aid of FIGS. 5 and 6.

Figure 5:
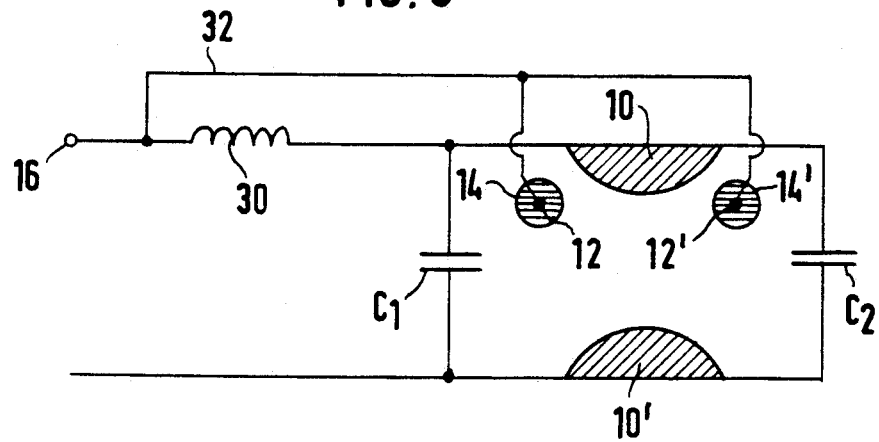
FIG. 5 shows a circuit for the preionization of a pulsed gas laser in which the high voltage for the preionization electrodes is tapped off in the high-voltage pulse direction before an inductance.
Figure 6:
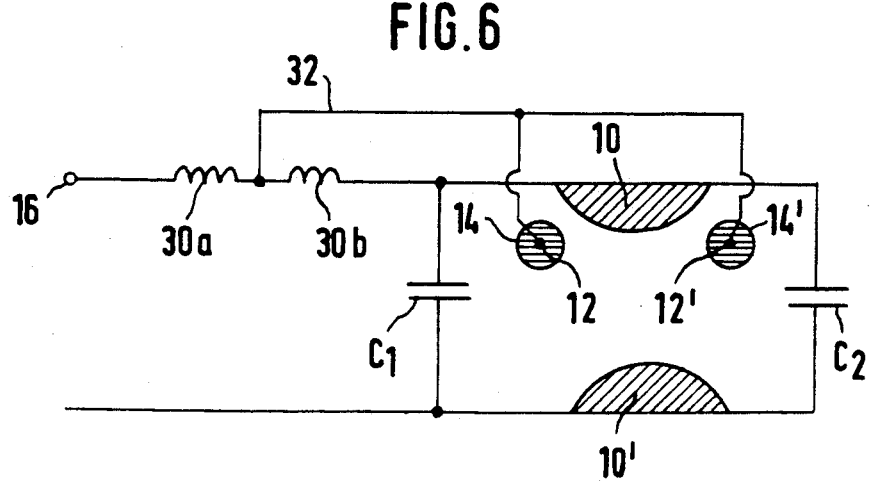
FIG. 6 shows a modification of the example of embodiment according to FIG. 5, the higher voltage for the preionization electrodes being tapped off between two inductances.

In FIGS. 5 and 6 the components corresponding to those according to FIGS. 1 to 4 are provided with identical reference numerals. Thus, adjacent respective main electrodes 10, 10' preionization electrodes 12, 12' are arranged, the spacing of the preionization electrodes 12, 12' from one of the main electrodes being less than from the other main electrode. According to the FIGS. 5 and 6 the preionization electrodes are arranged nearer the upper main electrode 10 than the lower main electrode 10'. In a modification of the example of embodiment illustrated it is also possible to provide a single preionization electrode 12; the symmetrical arrangement according to the Figures is however preferred.

Each of the preionization electrodes 12, 12' is surrounded by a respective tubular dielectric 14, 14'. The corona discharge burns on the outer surface of the dielectric.

A high-voltage source known per se for generating high-voltage pulses is indicated by the reference numeral 16. The thyratron 20 already described above, the storage capacitor 18 and the recharging inductance 22 are omitted in order to concentrate the illustration on the essence of the invention.

Figure 1:
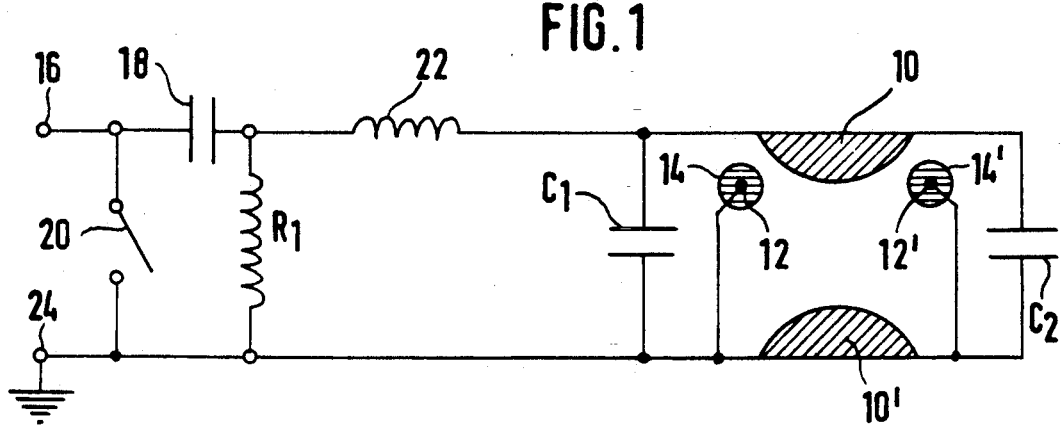
FIGS. 1–3 show different embodiments of a corona preionization apparatus in which the corona electrode is connected to the potential of the counter main electrode.
Figure 2:
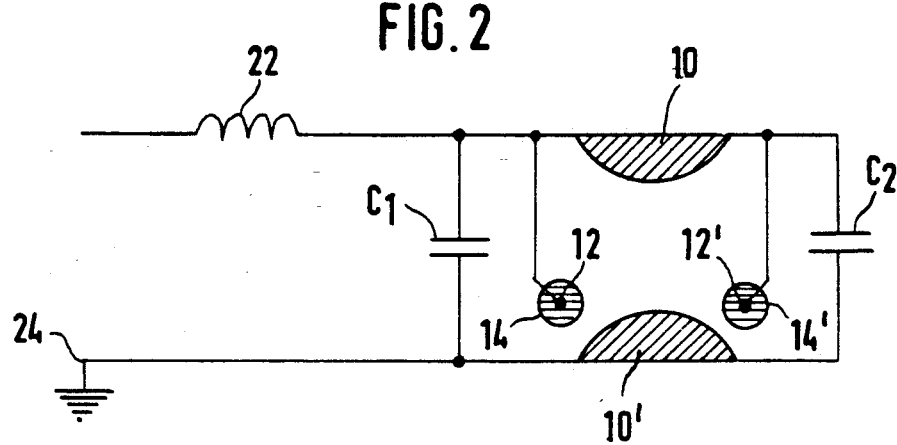
Figure 3:
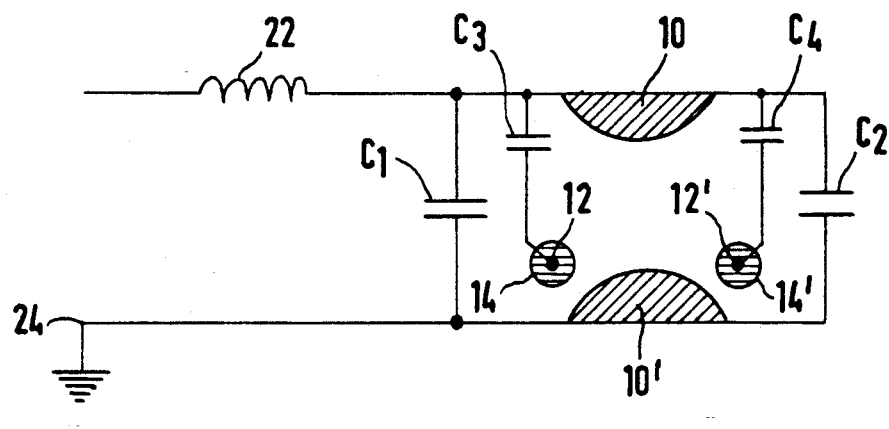
Figure 4:
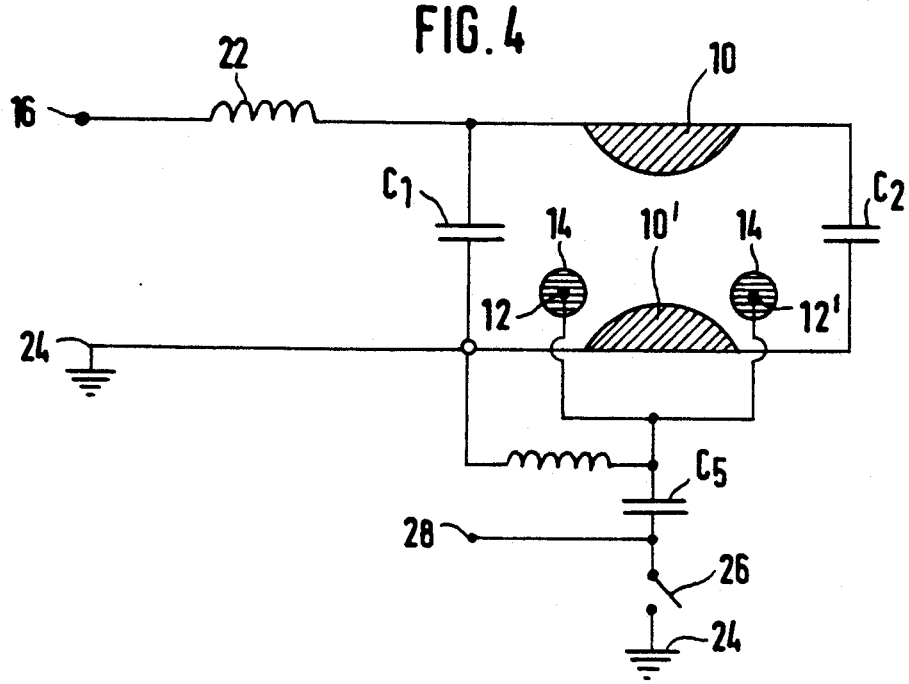
FIG. 4 shows an embodiment of a corona preionization apparatus having a separate current supply for the preionization electrodes.

Thus, in the circuits according to the invention for preionization of a pulsed gas laser as well for the preionization the same energy source is used which also serves for the main discharge, as explained with the aid of FIG. 1, i.e. the high-voltage source 16 and the energy storage means 18 respectively.

The essential matter is the provision of an inductance (coil) 30 in the preionization and main discharge circuit and the arrangement of the line 32 with which the preionization electrodes 12, 12' are put under voltage.

In the example of embodiment according to FIG. 5 the high-voltage source 16 generates high-voltage pulses with which the discharge capacitors $C_1$, $C_2$ are successively charged. During the charging of the discharge capacitors $C_1$, $C_2$ great current changes and corresponding voltage drops occur at the inductance 30. According to the invention the preionization electrodes 12, 12' are supplied with voltage via a line 32 which taps the potential off in the charging direction of the high-voltage pulses before the inductance 30. Due to this voltage tapping in front of the inductance 30, a very rapidly starting potential difference occurs between the preionization electrodes 12, 12' and the main electrode 10 adjacent thereto and correspondingly a corona discharge occurs on the dielectrics 14, 14' surrounding the preionization electrodes 12, 12'. As regards time the corona discharge thus generated coincides with the voltage rise between the main electrodes 10, 10'. The inductance 30 is so dimensioned that the time delay between the starting of the corona discharge and the main discharge gives a maximum laser power. For a given laser system the dimensioning of the capacitances and in particular of the inductance 30 depends on the specific line arrangements and the resulting parasitic inductances and capacitances and must be determined experimentally for the particular individual case. For a great number of excimer laser gas mixtures the time delay between preionization by means of corona discharge and subsequent main discharge has proved to be an optimum one for achieving a high laser power and long laser life. Special synchronization circuits are not necessary.

A further advantage of the circuit arrangement according to the invention for a preionization resides in that with increasing charging of the discharge capacitors $C_1$, $C_2$ the potential difference between the preionization electrodes and the associated main electrode diminishes. The voltage pulse obtaining between said electrodes is therefore of relatively short duration so that the risk of a breakdown through the dielectric is considerably reduced. As dielectric, in particular $Al_2O_3$ ceramic or sapphire have proved suitable.

FIG. 6 shows a modification of the example of embodiment according to FIG. 5, the inductance 30 being replaced by two inductances 30a and 30b and the line 32 applying the voltage to the preionization electrodes 12, 12' tapping the voltage between the two inductances 30a, 30b. By suitable variation of the inductances 30a, 30b the voltage profile between the preionization electrodes and the main electrode can be set experimentally and optimized for a specific system.

The arrangement described above is very simple in construction and circuitry and has proved itself for a great number of excimer laser gas mixtures; in particular, with XeCl and KrF laser gas mixtures homogeneous glow discharges up to very high pulse repetition rates of 200 Hz were implementable. The efficiency of the emitted laser radiation was exactly as high as when using a substantially more complicated spark preionization. The preionization apparatus according to the invention requires only four high-voltage leadthroughs into the laser chamber.

The circuit arrangements described above with the aid of FIGS. 5 and 6 for preionization of a pulsed gas laser drive the preionization electrodes 12, 12' utilizing the inherent capacitance of said rod electrodes. Additional capacitors and switches for operating the preionization are superfluous.

In addition, the arrangements described ensure an only short voltage pulse at the preionization electrodes, this leading on the one hand to an intensive corona discharge and on the other to a reduced risk of electrical breakdown of the dielectric. The geometry of the main discharge electrodes and the preionization electrodes described above with the aid of the Figures and the circuit described permit the use of solid profile main electrodes 10, 10'. Such solid profile main electrodes (i.e. solid electrodes in the form indicated in FIGS. 4 and 5) have advantages as regards the erosion behaviour and the control of the discharge cross-section. Apart from the advantages referred to above the circuit arrangement according to the invention also permits a compact structure.

What is claimed is:

1. A pulsed gas laser comprising:
   first and second main electrodes which are arranged in a chamber containing a gas;
   first and second preionizing electrodes arranged adjacent said main electrodes for generating ultraviolet radiation which preionizes said gas between said main electrodes prior to a main discharge between said main electrodes;
   a first electrical circuit for generating said ultraviolet radiation including said preionizing electrodes and an electrical line for applying a voltage to said preionization electrodes;
   a second electrical circuit including said main electrodes for facilitating said main discharge between said main electrodes;
   a switching element for closing both said first electrical circuit including said preionizing electrodes and said second electrical circuit including said main electrodes;
   a capacitor common to both said first electrical circuit and said second electrical circuit which is connected in series with both said first and said second electrical circuit such that the charge of said capacitor is utilized for both a preionization of said gas and for said main discharge;
   a high voltage source for charging said capacitor; and, an inductance connected in series with said second electrical circuit including said main electrodes for setting a time delay between said preionization and said main discharge.

2. The pulsed gas laser of claim 1, wherein said first electrical circuit and said second electrical circuit additionally comprise a second inductance wherein said electrical line of said first electrical circuit taps the voltage between said two inductances.

3. The pulsed gas laser of claim 1, wherein said preionization electrodes are corona electrodes.

4. The pulsed gas laser of claim 3, wherein said corona electrodes are surrounded by a tubular dielectric.

* * * * *